United States Patent [19]

Streicher

[11] 4,310,997
[45] Jan. 19, 1982

[54] TWO POINT HITCH CONSTRUCTION

[76] Inventor: Paul Streicher, Rte. 1, Box 107, Garden City, Mo. 64747

[21] Appl. No.: 145,382

[22] Filed: Apr. 30, 1980

[51] Int. Cl.³ .......................................... A01D 35/262
[52] U.S. Cl. .............................. 56/15.9; 56/DIG. 22; 280/460 A
[58] Field of Search ...................... 56/15.8, 16.1, 15.9, 56/16.2, DIG. 22; 280/460 A, 461 A, 456 A, 405 B

[56] References Cited

U.S. PATENT DOCUMENTS

| | | | |
|---|---|---|---|
| 3,015,927 | 1/1962 | Caldwell | 56/189 |
| 3,280,919 | 10/1966 | Bunting et al. | 280/460 A |
| 3,334,476 | 8/1967 | Engler | 56/15.9 |
| 3,564,822 | 2/1971 | Engler | 56/15.9 |
| 3,657,866 | 4/1972 | Burroughs | 56/15.9 |
| 3,802,172 | 4/1974 | Mathews | 56/15.8 |
| 3,841,415 | 10/1974 | Koenig et al. | 280/460 A |
| 4,195,860 | 4/1980 | Helams | 280/460 A |
| 4,212,144 | 7/1980 | Raineri | 56/15.8 |

*Primary Examiner*—Paul J. Hirsch
*Attorney, Agent, or Firm*—Lowe, Kokjer, Kircher, Wharton & Bowman

[57] ABSTRACT

A two point hitch for a mowing implement towed by a two point hitch tractor. The hitch structure includes a pair of upstanding plates which are pivotally pinned to the hitch arms of the tractor. A pair of support arms projecting from the implement underlie the hitch arms. When the hitch arms are raised, the support arms come into contact with them and the implement is thereafter raised in unison with the hitch arms to an elevated transport position.

5 Claims, 4 Drawing Figures

TWO POINT HITCH CONSTRUCTION

BACKGROUND AND SUMMARY OF THE INVENTION

This invention relates in general to hitches and deals more particularly with a two point hitch structure for coupling implements such as mowers to tractors.

Various types of farm and ranch implements are pulled through fields by tractors and other vehicles. For example, mowing of farm and ranch land is usually carried out by pulling a large mowing machine over the fields which are to be mowed. During transport of the mower between fields and when crossing ditches, steep banks and other irregular terrain, it is necessary to maintain the mower at a raised position above the ground. Typically, mowers and other implements are equipped with three point hitches that connect with the three hitch arms of a standard tractor. In the three point hitch arrangement, the third hitch arm is used to lift the implement to the desired position and to maintain it against any tendency to pivot downwardly about the pivot axis provided by the other two hitch arms. The need to equip the implement with a three point hitch adds considerably to its cost and complexity, as well as making the implement more cumbersome to manuever. Also, it is difficult and time consuming to couple the implement to the tractor for towing and to uncouple it after use.

The present invention is directed to an improved two point hitch structure for implements and has, as its primary object, the provision of a two point hitch which is simpler and more economical than existing hitches.

Another object of the invention is to provide a two point hitch of the character described which facilitates raising and lowering of the implement between the transport position and the operating position. It is a particularly important feature of the invention that the hitch can be used to raise the implement to a considerable height in order to facilitate crossing ditches and other uneven terrain.

A further object of the invention is to provide a two point hitch of the character described which is constructed in a sturdy manner to withstand the stresses applied to it when the implement is raised.

An additional object of the invention is to provide a two point hitch of the character described which is readily adapted for use with a wide variety of mowing machines and other types of implements towed by tractors.

Yet another object of the invention is to provide a two point hitch of the character described which is well suited for cooperation with virtually all standard two point hitch tractors.

A still further object of the invention is to provide a two point hitch of the character described which is easy to use and which can be quickly and easily coupled to and uncoupled from the tractor.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views.

Figure 1:
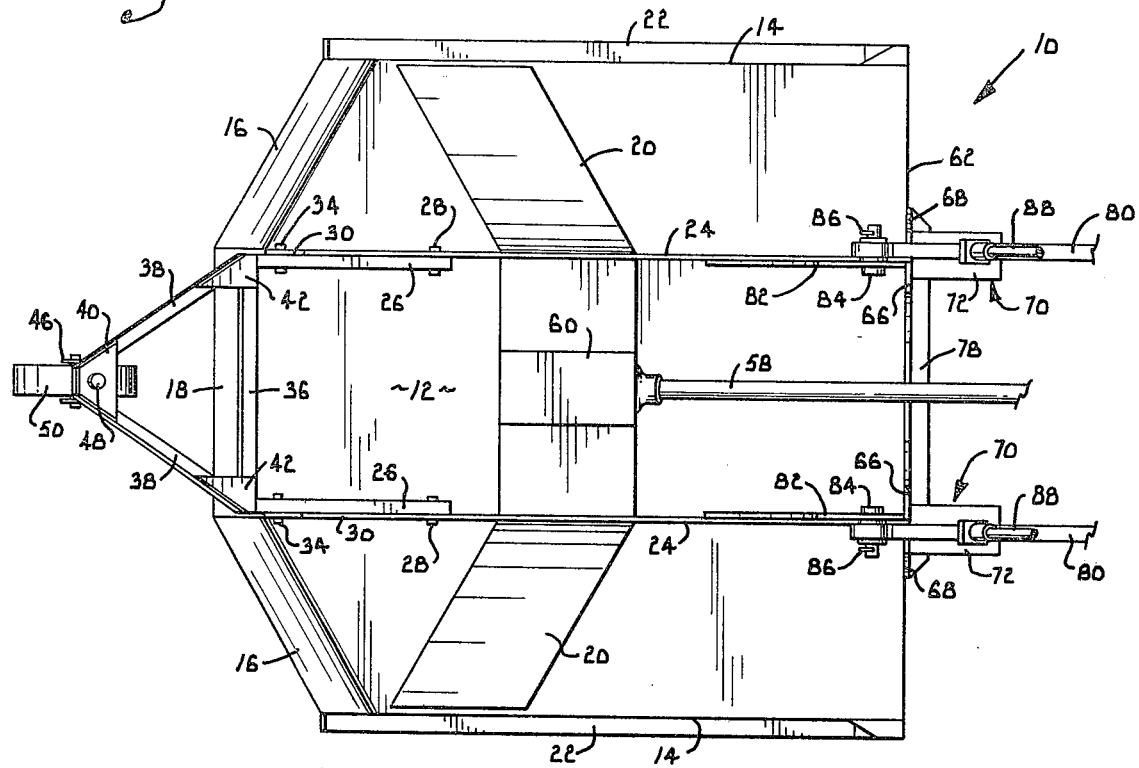
FIG. 1 is a top plan view of a rotary mowing machine which is equipped with a two point hitch constructed in accordance with a preferred embodiment of the present invention, the two hitch arms of a two point hitch tractor being shown only fragmentarily.

Referring now to the drawings in detail, reference numeral 10 generally designates a rotary mowing machine equipped with a two point hitch constructed in accordance with the present invention. The mowing machine 10 has a substantially flat deck 12 and opposite side panels 14. The rearward end of the mowing machine is formed by a pair of inclined skirts 16 and an inclined front panel 18 extending between the skirts. Mounted on top of deck 12 is a raised housing 20. A flange 22 projects outwardly from the lower edge of each side panel 14.

A pair of upstanding ribs or flanges 24 are formed on top of deck 12 and extend lengthwise in parallel relation to one another. A pair of channels form arms 26 which are pivoted at their forward ends with the respective flanges 24 by pivot pins 28. The rearward end portions of arms 26 connect with plates 30 which are mounted to deck 12 at locations adjacent the rearward ends of flanges 24. Each plate 30 has a plurality of openings 32 which are spaced vertically from one another and arranged in an arc centered at pin 28. Removable pins 34 are inserted through arms 26 and through selected openings 32 in order to secure arms 2b at the desired positions.

A horizontal angle member 36 extends between the rearward ends of arms 26. A pair of rearwardly converging arms 38 extend rearwardly and inwardly from rigid connections with the opposite ends of angle member 36 and are joined at their rearward ends by a pair of small plates 40. Gusset plates 42 reinforce the connections between arms 26, angle member 36, and arms 38. A vertical shaft 44 carrying a yoke 46 at its lower end is mounted for rotation by a bearing 48 which is mounted to plates 40. Yoke 46 carries a wheel 50 which supports the rearward end of the mowing machine.

Wheel 50 serves as a caster wheel which rolls along the ground to support the mowing machine at the desired height. The mowing height can be adjusted by removing pins 34 and reinserting them in another set of openings 32 to raise or lower wheel 50 relative to the frame of the machine.

Figure 4:
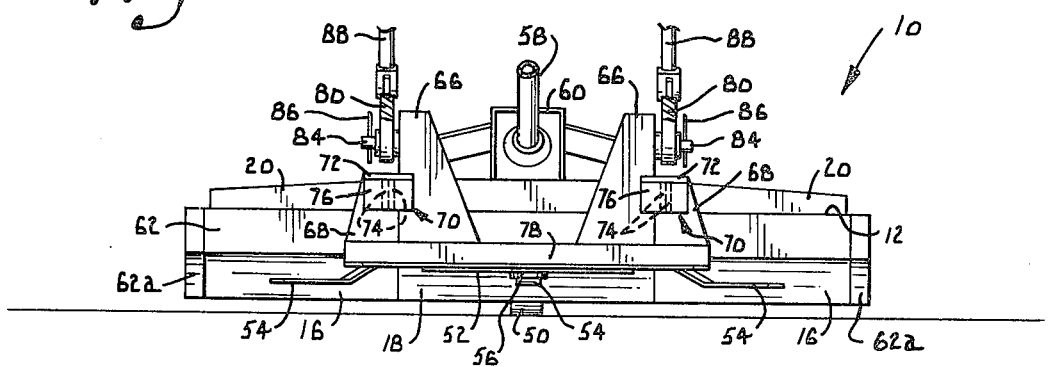
FIG. 4 is a front elevational view of the mowing machine taken generally along line 4—4 of FIG. 2 in the direction of the arrows.

As shown in FIG. 4, the mowing machine 10 has a rotary mowing blade 52 with three projecting knives 54. The knives have sharp edges in order to mow the grass when blade 52 is rotated. Blade 52 is mounted to the bottom of the mower and includes a central hub 56. Blade 52 is rotated by a shaft 58 which extends into a gear box 60 mounted on top of the raised housing 20. Shaft 58 is driven rotatively by the power take off of a tractor (not shown), and suitable gears (also not shown) connect shaft 58 with hub 56 in a conventional manner such that blade 52 is turned in response to rotation of shaft 58.

The forward end of mowing machine 10 is coupled with a tractor or other towing vehicle by a two point hitch constructed in accordance with the present invention. A front panel 62 of the mowing machine extends between sides 14 and has a flange 64 which is turned under and secured to the bottom surface of deck 12. Front panel 62 includes a lower incline portion 62a. Secured to the front surface of panel 62 are a pair of plates 66 which project well above the top surface of deck 12. Another pair of plates 68 are secured to front panel 62 adjacent the outer edges of plates 66. Plates 66 and 68 are preferably welded to panel 62.

A pair of support arms included in the hitch structure are generally designated by numeral 70. Each support arm 70 includes a flat upper plate 72 which is constructed of steel or the like and is welded at its rearward edge to plates 66 and 68 in projection forwardly from the mowing machine. A pair of reinforcing ribs for each plate 72 are formed by a pair of steel plates 74 having flat surfaces secured together, as by welding. Each plate 74 has its rearward edge welded to plate 68 and its upper edge welded to the underside of plate 72. An end plate 76 for each arm 70 is welded to the forward edge of each upper plate 72 and each rib plate 74. An angle member 78 is welded to front panel 62 adjacent the lower edges of plates 66 and 68.

The two hitch arms 80 of a standard two point hitch tractor (not shown) are pivotally coupled with upstanding plates 82 mounted on deck 12 adjacent flanges 24. The forward edge of each plate 82 is welded to the adjacent plates 66 and 68. A pivot pin 84 pivotally connects each arm 80 with the corresponding plate 82. Pins 84 receive cotter pins 86 to hold them in place and are coaxial to provide a horizontal axis about which the mowing machine is raised and lowered, as will be more fully explained. Hitch arms 80 extend above the flat top surfaces of the upper plates 72 of the respective support arms 70. The two point hitch mechanism of the tractor includes the usual pair of lift rods 88 which may be raised by a conventional power cylinder (not shown) in order to lift the hitch arms 80 in a well known manner.

In normal operation, the tractor pulls mowing machine 10 through the field which is to be mowed, and the power take off shaft 58 rotates cutting blade 52 such that knives 54 cut the grass. The height of the cut can be adjusted by positioning pins 34 in the various openings 32. The pivot connection provided by pins 84 permits the mower to readily travel over undulations and other uneven terrain.

Figure 3:
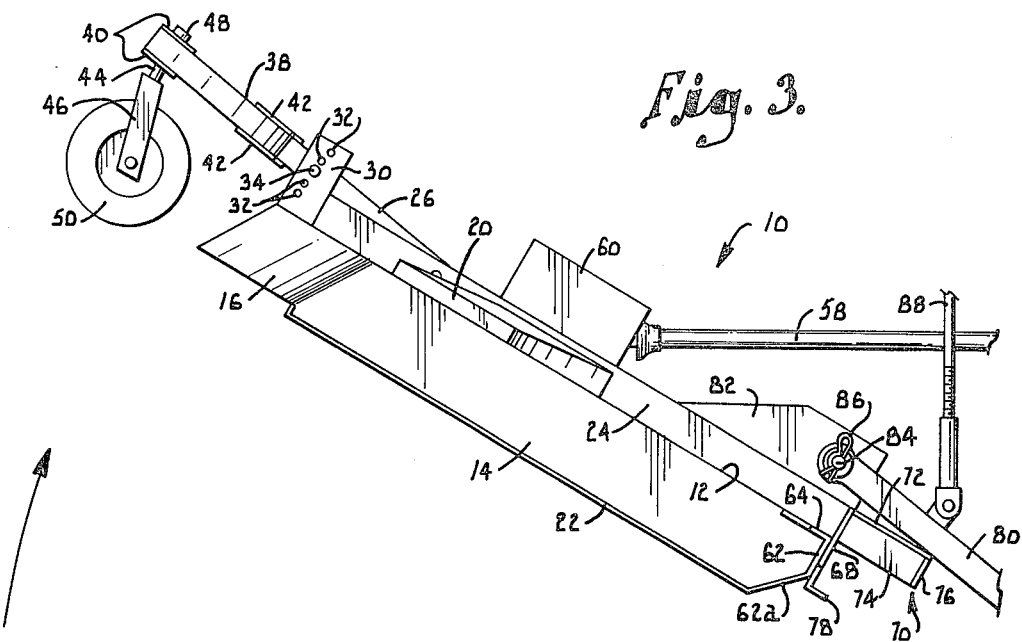
FIG. 3 is a side elevational view similar to FIG. 2 but showing the mowing machine raised to an elevated transport position.

When the mower is to be transported between fields or over ditches, steep banks, and other uneven terrain, it is raised to the transport position shown in FIG. 3. Lift rods 88 are raised by the power cylinder (not shown) in order to raise the hitch arms 80. As arms 80 are initially raised, the pivot connection provided by pins 84 permits mowing machine 10 to pivot relative to the hitch arms, with the weight of the machine causing its back end to remain on the ground due to the location of pins 84 adjacent the front end of the implement. Once the mowing machine has pivoted sufficiently to bring the upper surfaces of plates 72 into contact with the bottom surfaces of hitch arms 80, further pivotal movement of the mowing machine relative to the hitch arms is precluded. Consequently, additional raising of hitch arms 80 effects raising of the mowing machine along with the hitch arms. When the hitch arms are fully raised, mowing machine 10 is raised to the transport position shown in FIG. 3.

Figure 2:
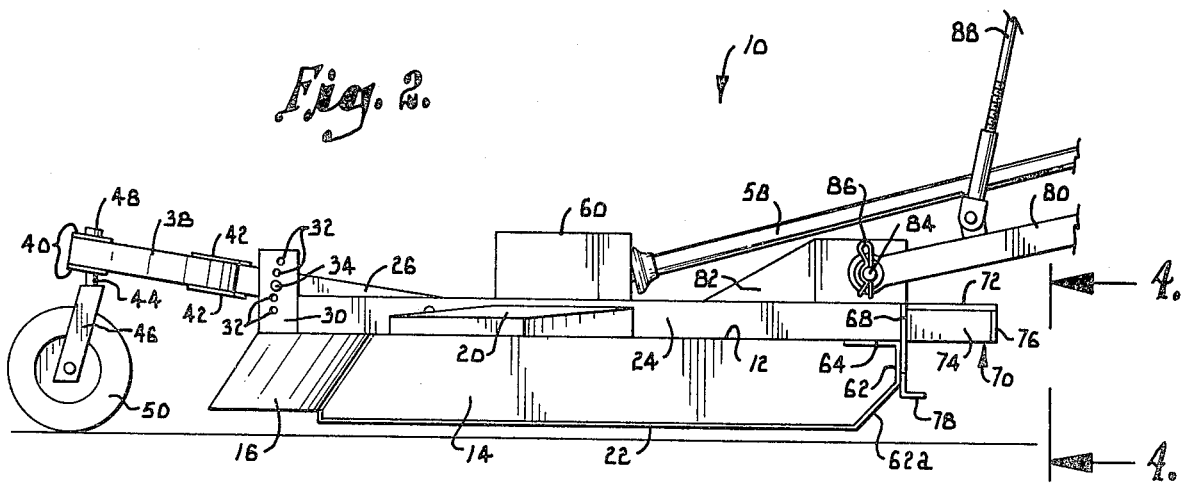
FIG. 2 is a side elevational view of the mowing machine shown in FIG. 1, with the machine in position to be towed along the ground by the tractor.

When mowing is to resume, mowing machine 10 is lowered to the ground by lowering hitch arms 80 to the operating position shown in FIG. 2. It is pointed out that the sturdy lifting frame provided by the support arms 70 and plates 66 and 68 provides a rugged construction which is easily able to withstand the stresses which are applied to arms 70 when the implement is raised. Plates 74 provide reinforcing ribs which strengthen the support arms 70. The flat upper surfaces of plates 72 are considerably wider than hitch arms 80, and it is thus assured that the plates come into contact with hitch arms 80 in the intended manner.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A two point hitch device for an implement to couple the implement at two points to a traction vehicle having a pair of hitch arms adapted to be raised and lowered, said hitch device comprising:
    a pair of plate members on the implement;
    means for pivotally connecting the hitch arms to the respective plate members in a manner coupling the implement to the traction vehicle for towing thereby and establishing a generally horizontal pivot axis about which the implement is pivotal relative to the hitch arms;
    a pair of support arms rigid with the implement and located to underlie the respective hitch arms when same are connected to said plate members, said support arms being spaced below the hitch arms during towing of the implement along the ground by the traction vehicle; and
    a rigid upper surface on each support arm located to be contacted by the corresponding hitch arm upon initial raising of same sufficient to effect a predetermined relative pivotal movement of the implement relative to the hitch arms, said upper surfaces remaining rigidly against the respective hitch arms upon additional raising of same to effect raising of the implement above the ground with the contact between said support arms and hitch arms preventing relative pivotal movement between the implement and hitch arms during such additional raising of the hitch arms.

2. A two point hitch device as set forth in claim 1, wherein said upper surfaces of said support arms are substantially wider than the respective hitch arms.

3. A two point hitch device as set forth in claim 1, wherein each support arm includes a generally horizontal plate providing said upper surface thereon and a generally vertical plate forming a reinforcing rib below and rigidly connected with said horizontal plate.

4. A two point hitch device as set forth in claim 3, wherein each support arm includes an end plate secured to a forward edge of the horizontal plate and to a forward edge of the vertical plate.

5. A two point hitch device as set forth in claim 3, including a rigid mounting plate for each support arm rigidly secured to the implement, said horizontal and vertical plates being rigidly secured to the respective mounting plates in forward extension therefrom.

* * * * *